(12) United States Patent
Wang (10) Patent No.: US 6,705,439 B1
(45) Date of Patent: Mar. 16, 2004

(54) BRAKE SHOE AND BRAKE ASSEMBLY

(75) Inventor: Nui Wang, Croydon (AU)

(73) Assignee: PBR Australia PTY Ltd. (AU)

( * ) Notice: Subject to any disclaimer, the term of this patent is extended or adjusted under 35 U.S.C. 154(b) by 0 days.

(21) Appl. No.: 09/673,010

(22) PCT Filed: Apr. 1, 1999

(86) PCT No.: PCT/AU99/00248

§ 371 (c)(1),
(2), (4) Date: Oct. 6, 2000

(87) PCT Pub. No.: WO99/53212

PCT Pub. Date: Oct. 21, 1999

(30) Foreign Application Priority Data

Apr. 9, 1998 (AU) ............................................. PP2914

(51) Int. Cl.⁷ ............................................... F16D 65/08
(52) U.S. Cl. ......................... 188/340; 188/338; 188/339
(58) Field of Search ................................. 188/336–341

(56) References Cited

U.S. PATENT DOCUMENTS

| | | | | | |
|---|---|---|---|---|---|
| 1,737,025 A | * | 11/1929 | Sanford | ....................... | 188/338 |
| 1,774,565 A | * | 9/1930 | Price | ........................... | 188/338 |
| 1,858,311 A | * | 5/1932 | Sneed | ........................... | 188/339 |
| 2,005,874 A | * | 6/1935 | Schwell | ....................... | 188/338 |
| 5,246,093 A | * | 9/1993 | Wang | ........................ | 188/340 |

* cited by examiner

*Primary Examiner*—Matthew C. Graham
(74) *Attorney, Agent, or Firm*—Nixon & Peabody LLP (57) ABSTRACT

A brake shoe assembly (1) for a drum brake, the brake shoe assembly being a single-piece construction and including a brake shoe (2) of generally circular form having two separate and opposed ends (17, 18), and defining a pair of friction lining mounting sections (11, 12) disposed on opposite sides of the brake shoe (2). The friction lining mounting sections (11, 12) have a T-shaped cross-sectional form defining an arcuate, radially outer platform (15) for mounting a friction lining (16) and a radially inwardly extending web (14). The brake shoe (2) including hinge means (27, 28) between the lining mounting sections (11, 12), facilitating pivoting movement of the lining mounting sections (11, 12), to alter the separation between the brake ends (17, 18) between a brake operative condition in which in use, the friction lining (16) engages a braking surface of a drum to which the brake shoe assembly (1) is fitted, and a brake inoperative condition in which there is no such engagement. The brake shoe assemblying further includes a backing plate depending from the brake shoe (2) in the region of the hinge means (27, 28) for mounting the brake shoe (2) to a brake shoe assembly support.

22 Claims, 4 Drawing Sheets

BRAKE SHOE AND BRAKE ASSEMBLY

This invention relates to drum brakes and is particularly although not exclusively concerned with internal drum brakes of the kind used with motor vehicles. It will be convenient to describe the invention with particular reference to internal drum brakes for use in motor vehicles, but it is to be understood that the invention has wider application.

The brake shoe used in internal drum brakes has traditionally been of a two-piece rigid type, or of a single piece band or loop type. The former type typically comprises a pair of substantially rigid shoes which are moved into engagement with the internal braking surface of a drum brake either by a plurality of actuators, or by a single actuator which acts at or toward one end of the brake shoes, with the opposite ends of the shoes being either in sliding or fixed pivoting abutment with a suitable abutment that projects from the backing plate. The latter type typically comprises a substantially cylindrical band having a gap defining opposed shoe ends, and which has a form promoting resilient flexibility. An actuator is operable at or adjacent the shoe ends to radially expand the band and cause engagement of friction lining disposed on a radially outer surface of the band against the internal braking surface of the drum and the resilient nature of the band acts as a spring to contract the band when the actuating force is released.

The above described brake shoes are separately fitted or mounted to assemblies that include a backing plate, against which the brake shoes are retained. Various means have been employed for this retaining function and in some forms of the two-piece shoe arrangement, the actuator and the abutment are fixed to the backing plate and their engagement with the respective brake shoe ends is such as to retain the brake shoes against the backing plate. In other arrangements, retaining clips have been employed to apply a retaining force to the brake shoe or pair of brake shoes and in still further arrangements, a combination of the above arrangements has been adopted.

Brake assemblies of the foregoing kind and particularly of the kind which employ two-piece brake shoes, are often of complex construction and are thus expensive and require careful manufacture and assembly. Moreover, such assemblies are prone to malfunction and wear because of corrosion or ingress of dust and dirt, due in part to the relative movement of the various parts.

It is an object of the present invention to provide either a brake shoe assembly for a drum brake which is of reduced complexity compared to known assemblies. It is a further object of the invention to provide an assembly in which the brake shoe is of a single piece construction, but which has similar operating characteristics to a rigid two-piece brake shoe construction. A still further object of the invention is to provide a new brake shoe assembly that can be actuated by known actuators. Yet a further object of the invention is to provide a method of making a brake shoe assembly for a drum brake.

According to the present invention there is provided a brake shoe assembly for a drum brake, said brake shoe assembly being of single-piece construction and including a brake shoe of generally circular form having two separate and opposed ends, and defining a pair of friction lining mounting sections disposed on opposite sides of said brake shoe which have a T-shaped cross-sectional form defining an arcuate, radially outer platform on which friction lining is mounted and a radially inwardly extending web, the cross-sectional form of each said lining mounting section causing said sections to have substantial rigidity in the plane of said web, said brake shoe including resilient hinge means between said lining mounting sections facilitating outward pivoting movement of said lining mounting sections to increase the separation between said brake ends between a brake operative condition in which in use, said friction lining engages a braking surface of drum to which the brake shoe assembly is fitted, and a brake inoperative condition in which there is no such engagement, a mounting member extending from said brake shoe in the region of said hinge means for connecting said shoe to a backing plate.

The above assembly is distinguished from prior art assemblies, in that the hinge means of the brake shoe assembly forms part of the single piece construction. Thus, the invention provides an assembly in which the lining mounting sections are of a substantially rigid construction as is normally only associated with a two-piece brake shoe assembly, but the assembly of the invention does not require a separate abutment to extend from the backing plate for the purpose of pivoting movement of brake shoes thereabout, as is required in the prior art. That is, in the invention, the shoes are formed as the lining mounting sections which are not separate components, but are part of a composite or integral construction which provides facility for the lining mounting sections to pivot relative to other parts of the assembly, and for which the torque reaction load under braking conditions is transmitted to the backing plate.

The lining mounting sections may be hinged by any suitable hinge means and that may include arranging them about a single hinge, or about a pair of hinges about which the lining mounting sections are separately or simultaneously pivotable. In a preferred form of the invention a pair of circumferentially spaced hinges, having reduced resistance to radial flexing of the brake shoe compared to the lining mounting sections are provided, and each lining mounting section is separately pivotable about a respective hinge.

The hinged arrangement of the lining mounting sections of the brake shoe is preferably one that provides for return movement of one or each lining mounting section, after an actuating force that shifts the section outwardly ceases to be operable. Thus, the hinged arrangement preferably has a resilience against such outward shifting, and that resilience may occur as a result of hinge construction, or may be a function of the material of which the hinged arrangement is made. Such an arrangement can reduce or eliminate the need for return springs or other equivalent systems, as are normally required in two-piece brake shoe assemblies.

The brake shoe assembly further includes means facilitating connection thereof to a backing plate and that means includes a mounting member to which the backing plate can be connected, and such connection can be by way of standard fasteners or by welding. The mounting member may be separately fixed to the assembly, but preferably it is integrally formed therewith. The mounting member preferably extends from the brake shoe assembly as a projection between the pair of circumferentially spaced hinges as provided in the preferred form of the brake shoe assembly.

In an alternative form of the invention, the brake shoe assembly is formed with a backing plate and that backing plate preferably depends from the mounting member which extends from the assembly, preferably between the pair of circumferentially spaced hinges as provided in the preferred form of the brake shoe assembly. The backing plate may be fixed to the mounting member by any suitable means as previously discussed, or alternatively it may be formed as an integral extension of that member.

The present invention further provides a method of forming a brake shoe assembly according to the invention, said method including deforming the edge of a planar circular disc (otherwise known as a shoe blank) to form an annular rim extending about the disc substantially perpendicular thereto and substantially centered relative to the portion of said disc inward of said rim, relatively severing and pressing sections of said disc to form said shoe ends, said lining mounting sections, said hinge means and said mounting member.

The present invention further provides a drum brake assembly that includes a drum rotatable about an axis and an inner cylindrical braking surface. Such a drum brake assembly includes a brake shoe assembly according to the invention and further includes actuating means being disposed between said lining mounting sections of said brake shoe assembly, which are operable to increase the separation between said brake shoe ends by pivoting movement of said lining mounting sections about said hinge means and expand said brake shoe from the brake inoperative condition to the brake operative braking condition (as hereinbefore defined) return means facilitating return movement of said lining mounting sections from said operative condition to said inoperative condition when said actuating means ceases to be operable to maintain said increased separation of said brake shoe ends, said backing plate extending from said mounting member for fixing to a drum brake assembly support.

A drum brake assembly according to the invention includes each of the advantages discussed earlier in relation to the brake shoe assembly, particularly the reduction in separate components, but the drum brake assembly of the invention is also considered to significantly reduce installation and maintenance times, and thus the costs associated with these procedures. It is envisaged that the brake shoe assembly of the invention will be fully replaceable on full friction lining wear, and this will provide an advantage over present known arrangements which require individual brake shoe removal and replacement, and thus the removal and replacement of the brake shoe assembly of the invention conveniently requires only unfastening of the whole worn brake shoe assembly, and replacement with a new assembly. The inconvenience of disassembling and reassembling a pair of brake shoes against a backing plate is therefore eliminated.

The attached drawings show example embodiments of the invention included in an assemblies of the foregoing kinds. However, the particularity of those drawings and the associated description does not supersede the generality of the preceding broad description of the invention.

Figure 1:
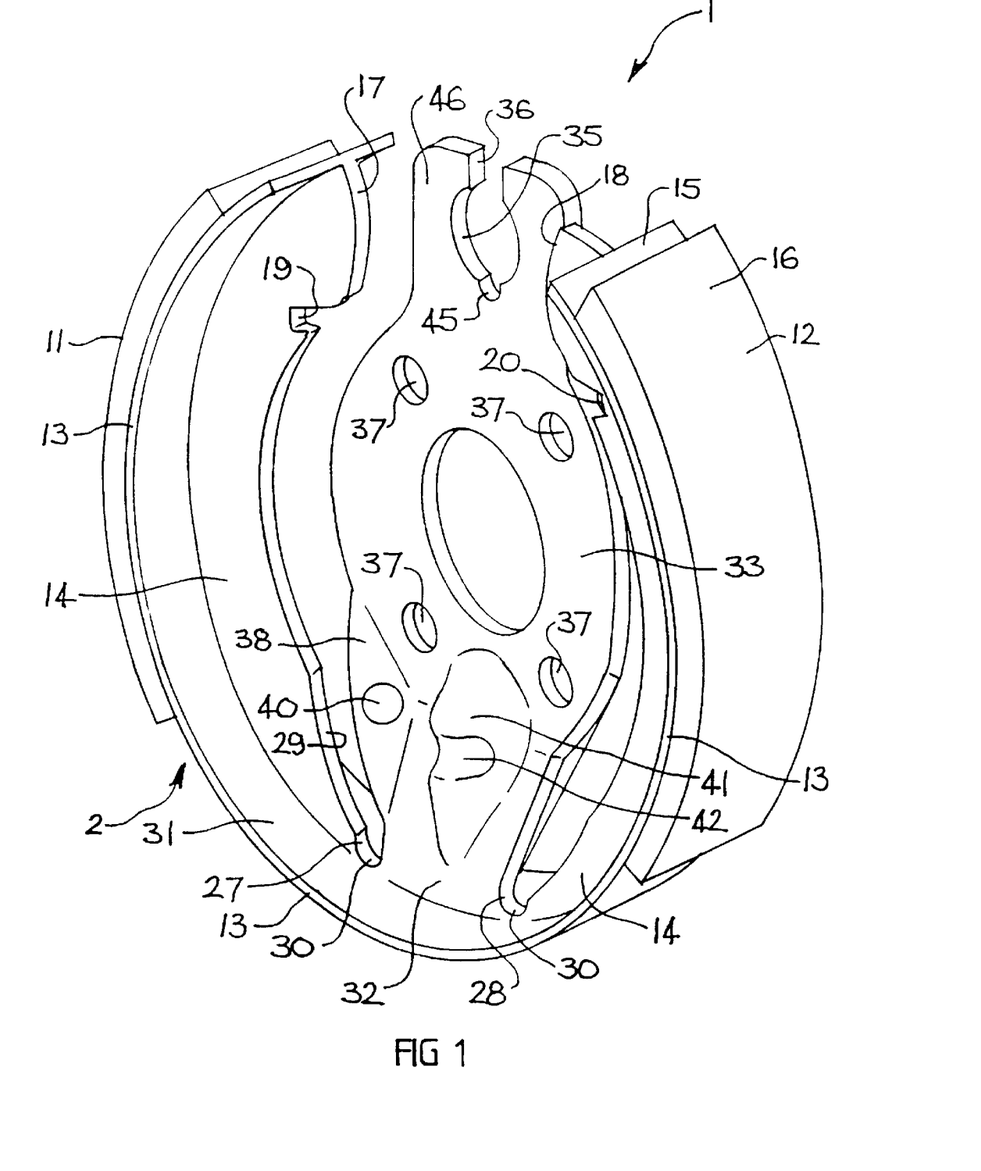

FIG. 1 shows a perspective view of one embodiment of a brake shoe assembly according to the invention. The brake shoe assembly 1 is formed in a single piece construction and includes a generally circular brake shoe 2. The brake shoe 2 includes a pair of rigid friction lining mounting sections 11 and 12, which have a T-shaped cross-sectional form comprising a rim 13 and a web 14. Other cross-sectional forms have been used in brake shoe design, and in particular, channel sections have been widely used. However, the T-shaped cross-sectional form is a desirable cross-section for the lining mounting sections to have because it is a more weight-efficient, stiff section. The lining mounting sections 11 and 12 are required to be substantially rigid to resist bending in the plane of the web 14, so as to ensure complete and efficient contact of the friction lining 16 against the internal braking surface of a drum brake (not shown). Such contact is important, as the radial forces on the lining can be very high under braking conditions and any inward shoe distortion, even to a small extent, may result in a significant area of the lining providing a reduced or negligible braking effect. The friction lining 16 can be attached to the rim 13 in any suitable manner such as known in the art.

The brake shoe 2 includes a pair separate and opposed end faces or shoe ends 17 and 18 and these define a gap therebetween. When the brake shoe assembly 1 is installed in a brake drum, an actuator is mounted between the shoe ends 17 and 18 and operation of the actuator is such as to move the shoe ends apart when a braking force is applied so that the lining mounting sections 11 and 12 are each shifted outwardly into an operative braking condition. That movement causes engagement of the friction lining 16 with the internal braking surface of the drum brake, while return movement of each lining mounting section in the opposite direction when the actuating force is removed, releases the friction lining 16 from that engagement. The web 14 of each lining mounting section 11 and 12 is arranged for cooperation with a suitable actuator and the brake shoe assembly 1 conveniently can be arranged for use with a variety of known actuators. Also, each of webs 14 includes a notch 19, 20 for location of an adjuster strut (not shown), of a kind which is known in the art although other arrangements for locating such a strut could equally be employed. Openings (not shown) may additionally be provided in the webs 14 for the attachment of brake shoe return springs.

Figure 2:
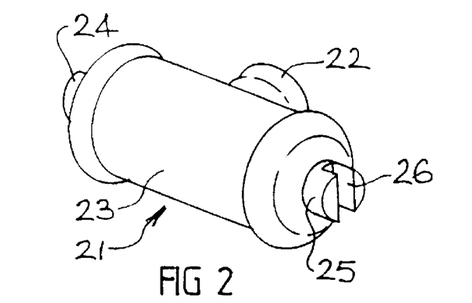
Figure 2A:
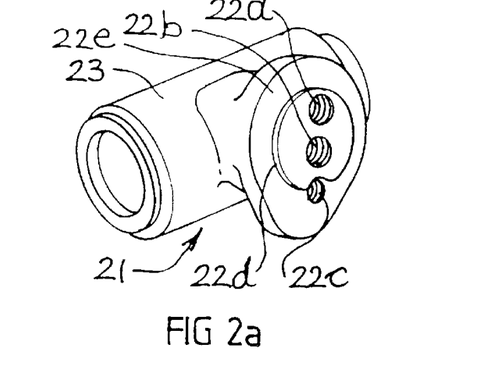

The actuator 21 shown in FIGS. 2 and 2a is hydraulically operated and includes a connection 22 for connection to a hydraulic fluid line. That connection 22 also includes facility for mounting the actuator 21 to a backing plate. Referring to FIG. 2a, the connection 22 includes on a rear surface thereof, a bleed hole screw connection 22a, a hydraulic feed hole screw connection 22b and a screw connection 22c for mounting the actuator 21 to the brake shoe assembly 10. The actuator 21 also includes a hydraulic cylinder 23 that accommodates a pair of opposed pistons or push rods that have ends 24 and 25. The ends 24 and 25 may engage to the shoe ends 17 and 18 by any suitable arrangement or alternatively, they may be slotted as shown and each slot 26 (only one of which is visible in FIG. 2) engages either side, ie across the thickness of the web 14 adjacent the shoe ends 17 and 18. This slotted arrangement inhibits axial movement of the shoe ends 17 and 18. The ends 24 and 25 are shown in FIGS. 2 and 2a in a retracted position and are operable 30 to extend out of the cylinder 23 under hydraulic pressure to move the shoe ends 17 and 18 of the brake shoe assembly 1 apart. The actuator could alternatively take other forms and could be pneumatic, electric or mechanically operated.

As is apparent from the illustration shown in FIG. 1, the brake shoe assembly 1 is of a single piece construction, in which the lining mounting sections 11 and 12 are integrally connected and that connection is through a region that includes hinge means in the form of a pair of hinges 27 and 28. Each of the rigid lining mounting sections 11 and 12 is caused to pivot about a respective hinge 27 or 28 upon an actuating force being applied to pivotably shift the lining mounting sections outwardly. Thus, the brake shoe assembly 1 flexes at the hinges 27 and 28 when an actuating force is applied, and the lining mounting sections remain rigid, or at least substantially rigid during actuation. This is an important characteristic of the lining mounting sections as discussed earlier.

The hinges 27 and 28 are formed by a reduction in the inward radial extent of the web 14 and in the embodiment shown, that reduction commences with a tapered section 29 that tapers to a channel 30, although the tapered section 29 is not on essential requirement. Indeed, the hinges could alternatively be provided by a pair of openings in the web 14 formed in a similar position to the hinges 27 and 28, with a radially open slot extending from each opening to the radially inner edge of the web. However, in the embodiment shown, the channel 30 forms the section of the hinge that the lining mounting sections 11 and 12 each pivot about. In the illustration shown, the depth of each channel 30 extends to, or substantially to, the radially inward surface 31 of the rim 13. The resistance to pivotal movement of the hinges 27 and 28 is a function of the material from which the brake shoe assembly 1 is formed and also of the configuration adopted. If for example, the channel 30 did not extend to the inside surface 31 of the rim 13, so that a portion of the web 14 were to remain upstanding at the base of the channel 30 from that surface, then the resistance to radial flexing of the lining mounting sections 11 and 12 about the hinges 27 and 28 would be greater when compared to that of the illustrated arrangement in which no portion, or at least a negligible portion of the web 14 remains upstanding. The resistance also depends on the material characteristics of the brake shoe 2 and the relative dimensions of the hinges of the brake shoe assembly.

The hinges 27 and 28 illustrated show one suitable form only and other forms of hinges could be equally appropriate. For example, the channel 30 could be differently shaped and the taper 29 could be modified or omitted. Alternatively, the connection between the lining mounting sections 11 and 12 may be somewhat different to that illustrated and the hinges may be formed by other means. Also, while two hinges are illustrated, the invention includes an arrangement in which the lining mounting sections are each pivotable about a single hinge, or about two or other number of hinges as will be described later.

The hinge arrangement shown in FIG. 1 advantageously facilitates a resiliently flexible brake shoe assembly in which the lining mounting sections 11 and 12 are biased towards a radially inward position. That is, the brake shoe assembly 1 itself acts as a spring so that the lining mounting sections 11 and 12 are caused to retract from engagement with the braking surface of a drum brake upon release of a brake actuating force and thus the arrangement can be arranged to operate without the need for return springs. In some circumstances however, return springs may still be desirable, such as if an increased return force was required. The resilient arrangement of the brake shoe can also ensure that the opposed sides of the brake shoe 2 constantly bear under pressure against an adjuster strut located by the notches 19 and 20.

A mounting member in the form of a projection 32 extends radially inwardly between the hinges 27 and 28 and is integrally connected to the rim 13 extending between the lining mounting sections 11 and 12. The projection 32 absorbs at least a major portion of the torque generated during braking and can be considered to operate in an equivalent manner to the shoe abutment of a conventional brake. The sides of the projection 32 form, in the arrangement illustrated, sides of the channels 30 of the hinges 27 and 28. In the alternative, the projection 32 could extend from a position axially spaced from that shown, or it might be separated from the hinges circumferentially. Other arrangements might be equally appropriate. In the illustrated arrangement, the projection 32 at least initially extends from the rim 13 perpendicular thereto after which there is an axial deviation of the projection for connection thereof to a backing plate 33. It is however, not essential that the projection 32 have a configuration as illustrated.

Figure 3:
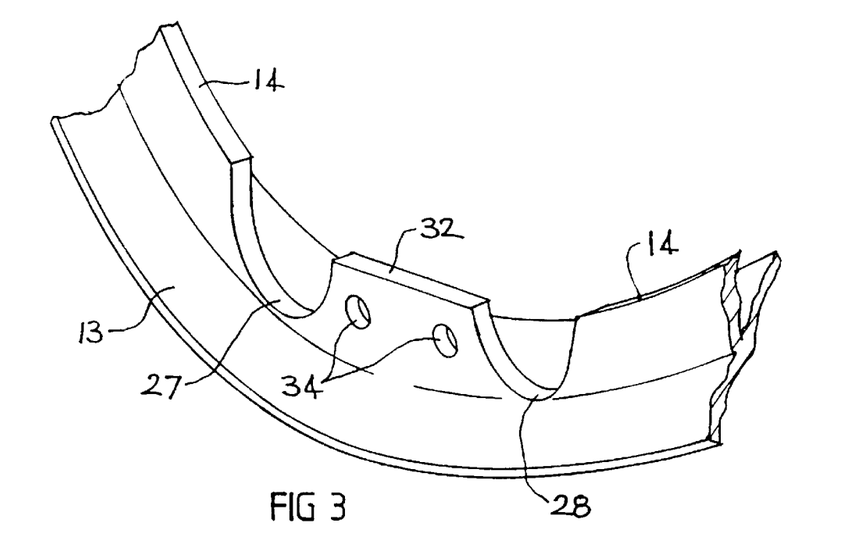

In an alternative arrangement as shown in FIG. 3, the projection 32 is not integrally connected to a backing plate, but instead includes means by which the backing plate can be attached to the projection 32. In the arrangement illustrated, those means are rudimentary, in the form of a pair of openings 34, which could receive nut and bolt, or rivet fasteners for example, for attachment of the backing plate. Other means could alternatively be adopted, such as connection by conventional welding techniques.

The backing plate 33 includes a plurality of openings suitable for location and fixing thereof to a support. The opening 35 is provided for receiving and fixing the hydraulic actuator connector 22 to the backing plate 33. The opening 35 is formed with a mouth 36 which facilitates removal of the actuator 21 without necessarily removing the hydraulic line or bleed line connected to the actuator. The opening 35 is additionally formed with a notch 45, which accommodates a screw connector for threaded attachment to the screw connection 22c of the actuator 21 (FIG. 2a). The opening 35 is shaped to receive in a close fit, the spigot 22d of the actuator 21, so that the surface 22e of the actuator 21 abuts against the surface 46 of the backing plate 33, when a screw connector is fitted to mount the actuator 21 to the backing plate 33. The actuator 21 is substantially prevented from rotating in this arrangement, due to the location of the screw fastener in the notch 45.

Figure 4:
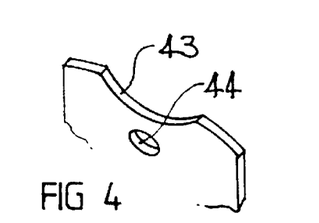

An alternative arrangement is shown in FIG. 4, which is a cut away section in the region of the opening 35 shown in FIG. 1. In this arrangement, the backing plate includes a saddle 43 instead of a substantially closed opening 35. The backing plate further includes an opening 44, which may be threaded for receipt thereof of a fastener, such as screw fastener to fasten the actuator thereto. The opening 44 may be arranged to align with the screw connection 22c of the actuator 21.

Other openings 37 are provided for the purpose of attaching the brake shoe assembly 1 to the axle flange or knuckle of a vehicle. Each of the openings is positioned in accordance with the attachment requirements and a person skilled in the art will be familiar with these requirements.

Wings 38 and 39 are provided between the projection 32 and the backing plate 33, and while the provision of these wings is preferred only, they can provide a strengthening or stiffening effect in that region. The wings can additionally or alternatively facilitate location of a handbrake cable, and for that purpose, a cable abutment opening 40 is formed in the wing 38. The cable abutment opening 40 is of a diameter so that the cable conduit abuts against the side of the wing 38 which is obscured from view in FIG. 1, but which allows the cable (not shown) to extend therethrough.

The cable can extend from the opening 40 to the lever of a mechanical handbrake actuator (not shown) in any suitable manner and there may be provided a cable guide 41 which is formed as a further projection out of the projection 32 and the backing plate 33. The cable guide 41 includes a channel 42 that guides the cable toward the lever of the mechanical actuator provided.

Figure 5:
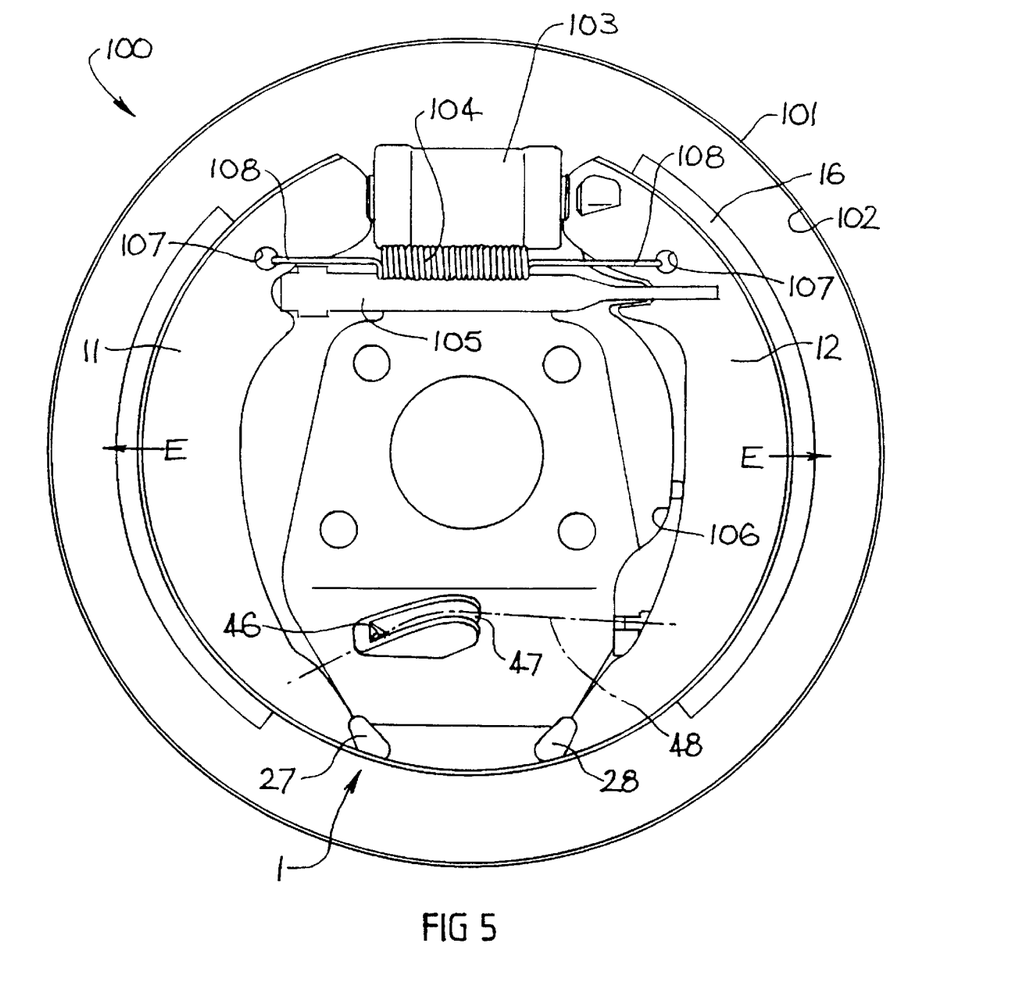

In an alternative arrangement shown in FIG. 5, a different form of cable guide is provided. In this form, the cable guide 45 is formed as an insert, such as a moulded plastic insert, that is fitted into an opening formed in the backing plate and is held in that opening in any suitable manner. The insert includes an opening 46 and a cable race 47 and the lie 48 of the cable is shown in dot outline. The insert can be connected to or formed integrally with the cable conduit. For example, the insert could be diecast and attached to the cable conduit by crimping, whereafter it is fitted into the opening and fastened in place by a screw fastener. In another alternative arrangement (not shown) where cable actuation is in a direction substantially perpendicular to the backing plate (normally referred to as "cross-pull" actuation), no such cable race or conduit abutment are required.

The arrangement shown in FIG. 5 differs from that shown in FIG. 1 in several respects, although the operation thereof is substantially the same. FIG. 5 does however show a drum brake assembly that employs a brake shoe assembly according to the invention and therefore, in describing the arrangement of FIG. 5, the reference numerals already used for the brake shoe assembly of FIG. 1, will be retained.

The drum brake assembly 100 is to be fitted to a drum (not shown) which is rotatable and which has an inner braking surface. The assembly 100 includes a dirt shield 101 having an inwardly extending lip 102, that cooperates with an edge of the drum to form a labyrinth type dirt seal. The assembly further includes an actuator 103, a return spring 104, an adjuster strut 105 and a handbrake lever 106, which is connected to the cable shown in dot outline 48.

The brake shoe assembly 1 includes such mounting arrangements as are necessary to mount the components 103 to 106 described above. For example, the lining mounting sections 11 and 12 include openings 107, to receive end hook sections 108 of the return spring 104 to locate the spring relative to the brake shoe assembly 1. The necessary mounting arrangements for the other components would be easily understood by a person skilled in the 15 art.

Actuation of the actuator 103 causes expansion of the brake shoe 1, by pivotal movement of the lining mounting sections 11 and 12 in the respective direction E about the hinges 27 and 28. When the actuating force is released, the resilient nature of the hinges 27 and 28 and the biasing force of the spring 104 return the lining mounting sections by reverse pivoting movement.

The adjuster strut 105 operates in a known manner such as to limit return movement of the lining mounting sections 11 and 12 to compensate for friction lining wear. For example, the adjuster strut 105 may employ a ratchet compensator that gradually increases the length of the strut 105 as the friction lining wears. The actuator also is preferably of a kind that is adjustable to accommodate friction lining wear and for example, a friction-ring type actuator may be employed. Such an actuator can include a piston/cylinder arrangement, in which an annular groove extends about the outer surface of the piston for locating a friction ring. The axial width of the groove is equal to the width of the friction ring plus an amount equal to the desired travel of the shoe ends during actuation of the brake. The friction ring is attached to the interior surface of the cylinder and upon wear of the friction lining, the friction ring will slip relative to the cylinder surface during brake actuation so that the piston is forced to extend out of the cylinder to a greater extent. The friction ring will retain its new position relative to the cylinder surface so that the return stroke of the piston, and hence friction lining to drum clearance, remains substantially constant despite wear of the friction lining. This type of actuator is sometimes necessary for preventing the return load of one of the lining mounting sections from applying a radially outward force on the other lining mounting section, such as through the adjustor strut. An actuator of the above kind can alternatively have the annular groove formed in the interior surface of the cylinder, and the friction ring located therein and attached to the outer surface of the piston. This type of actuator will operate essentially in the same manner as the style actuator first described.

Figure 6:
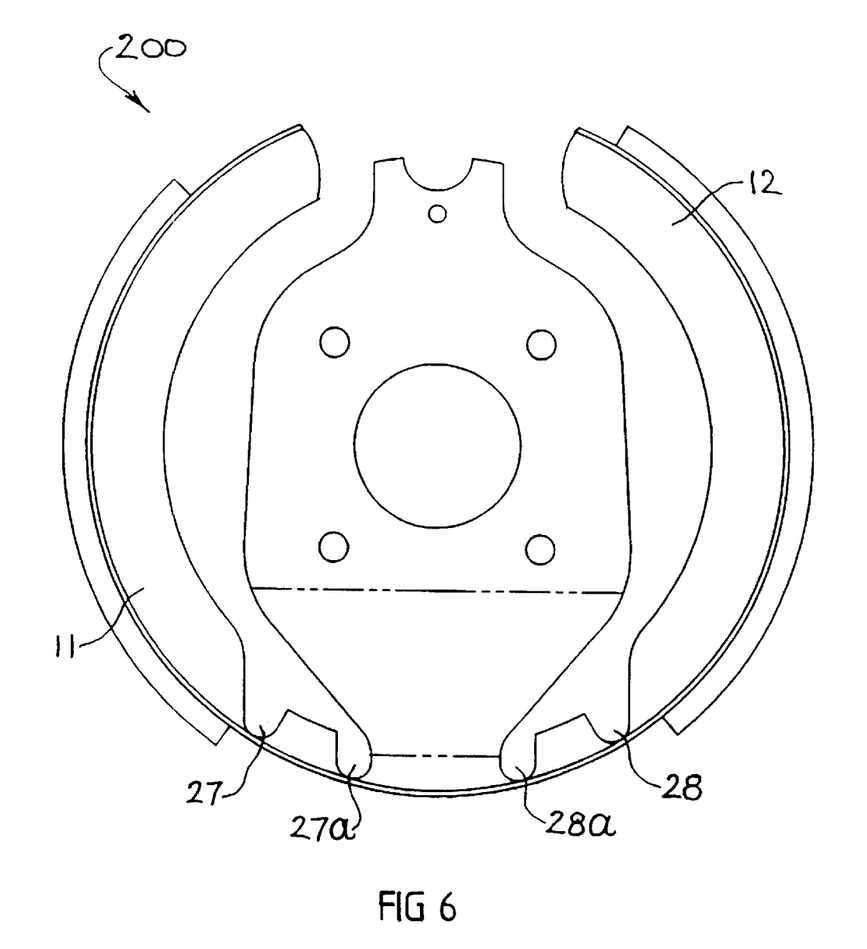

A further alternative arrangement is shown in FIG. 6. The arrangement is shown schematically only, as it largely includes the same features and components and operates in the same manner as the arrangements shown in FIGS. 1 and 5. The brake shoe assembly 200 of FIG. 6 includes 4 hinges 27, 27a, 28 and 28a and this arrangement permits movement of each lining mounting sections 11 and 12 in two degrees of freedom instead of the single degree of freedom of the FIG. 1 and 2 arrangements. Thus the brake shoe assembly 200 provides for pivoting movement of each lining mounting section 11 and 12, but also provides for floating movement of those sections in a plane parallel to the shoe web. This additional degree of movement can be advantageous in circumstances when the brake shoe assembly and the drum to which it is fitted, do not match correctly. This could occur for example, if the drum has a slightly different diameter or curvature than the friction lining, or if the mounting for the brake assembly causes the friction lining to be slightly misaligned relative to the drum. The second hinge for each lining mounting section essentially allows the respective lining mounting section to position itself under brake actuation, for better and more complete engagement with the drum braking surface than would be the case if pivoting movement was the only movement available.

The hinges 27a and 28a need not have the same configuration as the hinges 27 and 28, but may have any suitable configuration to provide for floating movement.

In practice, it is normally recommended that both a labyrinth and a dirt shield be attached to the brake shoe assembly, particularly in the case of cars and trucks etc, to restrict ingress of foreign matter into the brake shoe assembly.

The present invention further includes a unique method of manufacturing a brake shoe assembly of single-piece construction. The brake shoe assembly formed by the method of the invention includes a pair of substantially rigid friction lining mounting sections configured and disposed in a manner as previously described and a mounting member for mounting a backing plate, and it can also include a backing plate. The method generally includes a two-stage process, although additional stages can be included as necessary. The method employs a rim forming operation and a stamping or pressing operation. It is possible for the stamping or pressing operation to be conducted in more than a single operation, such as partly before and partly after the rim forming operation. This is attractive, because for certain parts of the brake shoe assembly that are formed by the stamping or pressing operation may be more easily formed before the rim forming operation than after. For example, formation of hinges that are positioned in contact with or very close to the rim of the formed brake shoe assembly, are likely to be more easily formed prior to formation of the rim than after. That is because the rim can obstruct the stamping or pressing equipment from stamping or pressing sections of the shoe blank close to the rim.

The method employed to form the brake shoe assembly involves forming the rim 13 from a shoe blank formed as a metal disc. The preferred method involves splitting the circumferential edge of the blank by suitable means such as flow forming and flaring the split portions of the edge apart so as to be disposed at approximately 180° to each other, as well as perpendicular relative to the non-flared remainder of the blank. Alternatively, the method can employ an edge upsetting operation, which provides for a thickening of the edge of the blank. In this operation, the edge is thickened, such as by radial compression, and combined with an edge splitting operation, an annular rim of greater thickness can be produced. Other edge upsetting operations may also be employed.

The blank, is also pressed or stamped in one or a plurality of operations to separate and remove portions of the blank so as to form the lining mounting sections 11 and 12, the hinges 27 and 28, the projection 32 and the backing plate 33, as well as each of the openings and other necessary profiled formations. The stamping or pressing operation may not result in a brake shoe assembly of the exact tolerances required and therefore additional manufacturing stages may be necessary for that purpose. Additionally, the brake shoe assembly may require certain treatments for corrosion and wear resistance and for strengthening purposes, such as suitable heat treatments or surface hardening. Also, the brake shoe assembly 1 can be used with other ancillary components, such as a dust cover and suitable connections for such components may be provided for in the brake shoe assembly.

The method according to the invention can minimise the wastage of metal material because a major portion of the shoe blank can be utilised to form the brake shoe assembly. Additionally, the brake shoe assembly can largely be formed as a single-piece assembly, thereby removing the need for connection of components such as by fasteners or welds. This has a distinct advantage in relation to the vibration performance of the brake shoe assembly. As the assembly has a one-piece construction, the propensity for component parts to slide or vibrate relative to other component parts is greatly reduced. Moreover, the limited number of components of the brake shoe assembly provide for easier installation and maintenance. Additionally, the shoe can be formed to have a radial resilience so that the need for return springs is unnecessary, or at least the biasing requirement of the return springs is reduced. A further advantage of a brake shoe assembly according to the invention is that the need for an abutment extending from the backing plate to facilitate pivoting movement of the lining mounting sections is eliminated. The lining mounting sections instead are hingedly connected.

The brake shoe assembly can be formed in metals typically used for that purpose such as mild steel. However, the method is also applicable to other materials as may be used.

The invention described herein is susceptible to variations, modifications and/or additions other than those specifically described and it is to be understood that the invention includes all such variations, modifications and/or additions which fall within the spirit and scope of the above description.

What is claimed:

1. A brake shoe assembly for a drum brake, said brake shoe assembly being of single-piece construction and including a brake shoe of generally circular form having two separate and opposed ends, and defining a pair of friction lining mounting sections disposed on opposite sides of said brake shoe which have a T-shaped cross-sectional form defining an arcuate, radially outer platform for mounting a friction lining and a radially inwardly extending web, the cross-sectional form of each said lining mounting section causing said sections to have substantial rigidity in the plane of said web, said brake shoe including a recess formed in said web between said lining mounting sections, said recess being open inwardly and extending a substantial portion of the full depth of said web and acting as a hinge which facilitates pivoting movement of said lining mounting sections to alter the separation between said brake ends between a brake operative condition in which in use, said friction lining engages a braking surface of a drum to which the brake shoe assembly is fitted, and a brake inoperative condition in which there is no such engagement, a backing plate depending from said brake shoe in the region of said recess for mounting said brake shoe to a brake shoe assembly support.

2. A brake shoe assembly according to claim 1, said brake shoe including a connecting section extending between and in connection with said lining mounting sections, said connecting section including an inwardly extending web from which said backing plate depends.

3. A brake shoe assembly according to claim 2, said connecting section being formed as a circumferential extension of said T-shaped cross-sectional form of said lining mounting sections.

4. A brake shoe assembly according to claim 2 wherein said backing plate depends integrally from said inwardly extending web of said connecting section.

5. A brake shoe assembly according to claim 2 wherein said inwardly extending web of said connecting section forms an attachment member for attaching said backing plate to said brake shoe by fastening means.

6. A brake shoe assembly according to claim 5, wherein said backing plate is attached to said attachment member by threaded fasteners, rivets, or by welding.

7. A brake shoe assembly according to claim 1 including a first pair of circumferentially spaced recesses about which each said lining mounting section is separately pivotable.

8. A brake shoe assembly according to claim 7, including a second pair of circumferentially spaced recesses, said first and second pairs of recesses defining two hinge groups about which each of said lining mounting sections are separately movable, each said hinge group comprising one recess from each of said first and second pairs of recesses and said recesses of each said hinge group being disposed on either side of a relatively rigid member.

9. A brake shoe assembly according to claim 1, said backing plate being arranged to be located in a plane displaced from and parallel to the plane of said web of said lining mounting sections.

10. A brake shoe assembly according to claim 1, including a friction lining mounted to each of said lining mounting sections.

11. A brake shoe assembly according to claims 1, wherein said hinge means are resilient.

12. A drum brake assembly according to claim 1, including an actuating means being disposed between said lining mounting sections and operable to increase the separation between said brake shoe ends by pivoting movement of said lining mounting sections about said recesses and expand said brake shoe from said brake inoperative condition to said brake operative condition, return means facilitating return movement of said lining mounting sections from said operative condition to said inoperative condition when said actuating means ceases to be operable to maintain said increased separation of said brake shoe ends.

13. A drum brake assembly according to claim 12, said pivoting movement being resilient and constituting at least partly, said return means.

14. A drum brake according to claim 12, including a spring extending between said lining mounting sections and biasing said sections toward said inoperative position, said spring constituting at least partly said return means.

15. A brake shoe assembly for a drum brake, the assembly comprising a brake shoe member being of a single-piece construction and having a substantially circular form, the brake shoe member having two separate and opposed ends, a portion of the brake shoe member defining a pair of friction lining mounting sections disposed on substantially opposite sides of the brake shoe, each friction lining mounting section has a substantially T-shaped cross-sectional form defining an arcuate, radially outer platform for mounting a friction lining and has a radially inwardly extending web, the cross-sectional form of each lining mounting section causing the sections to have substantial rigidity in the plane of the web, the brake shoe member having a pair of circumferentially spaced recesses formed in the web between the lining mounting sections, each circumferentially spaced recess being open inwardly and extending a substantial portion of the full length of the web, each circumferentially spaced recess acting as a hinge which facilitates pivoting movement of a corresponding lining mounting section about a respective one of the pair of recesses to alter a separation gap between the two separate and opposed ends of the brake shoe member during a brake operative condition in which in use, the friction lining engages a braking surface of a drum to which the brake shoe assembly is fitted, and a brake inoperative condition in which there is substantially no engagement between the braking surface and the drum, the web of the brake shoe extending between the pair of circumferentially spaced recesses in connection with a backing plate for mounting the brake shoe member to a brake shoe assembly support.

16. A brake shoe assembly according to claim 15, wherein the backing plate depends integrally from the web between the pair of circumferentially spaced recesses.

17. A brake shoe assembly comprising:

a brake shoe member having a substantially circular shape and having a pair of opposing ends separated by a gap;

a first friction lining mounting section formed on the brake shoe member and substantially opposing a second friction lining mounting section formed on the brake shoe member, the first and the second mounting sections each defining an arcuate, radially outer platform;

a first web structure extending radially inwardly away from the outer platform of the first friction lining mounting section, the first web structure has a radial planar surface that is substantially perpendicular to the first friction lining mounting section outer platform and an inside surface of the brake shoe member, the first web structure extending from a first location at the inside surface towards the gap along a first radial axis that is parallel to the outer platform and the inside surface;

a first recessed region formed in a first portion of the first web structure near the first location, an inward radial extent of the first portion of the first web structure being reduced with respect to an inward radial extent of a second portion of the first web structure to create a first pivot point for the first friction lining mounting section;

a second web structure extending radially inwardly away from the outer platform of the second friction lining mounting section, the second web structure has a radial planar surface that is substantially perpendicular to the second friction lining mounting section outer platform and the inside surface of the brake shoe member, the second web structure extending from a second location at the inside surface towards the gap along a second radial axis that is parallel to the outer platform and the inside surface; and a second recessed region formed in a first portion of the second web structure near the second location, an inward radial extent of the first portion of the second web structure being reduced with respect to an inward radial extent of a second portion of the second web structure to create a second pivot point for the second friction lining mounting section.

18. A brake shoe assembly according to claim 17 wherein the first and the second friction lining mounting sections each have a substantially T-shaped cross-sectional form.

19. A brake shoe assembly according to claim 18 wherein the substantially T-shaped cross-sectional form of the first and the second friction lining mounting sections causes the sections to have substantial rigidity in the plane of each web structure.

20. A brake shoe assembly according to claim 17 wherein the radially outer platform of the first and the second friction lining mounting sections are each mounted to a friction lining.

21. A brake shoe assembly according to claim 17 wherein the third web structure is coupled to a backing plate for mounting the brake shoe member to a brake shoe assembly support.

22. A brake shoe assembly comprising:

a brake shoe member having a substantially circular shape and having a pair of opposing ends separated by a gap;

a first friction lining mounting section formed on the brake shoe member and substantially opposing a second friction lining mounting section formed on the brake shoe member, the first and the second mounting sections each defining an arcuate, radially outer platform;

a first web structure extending radially inwardly away from the outer platform of the first friction lining mounting section, the first web structure has a radial planar surface that is substantially perpendicular to the first friction lining mounting section outer platform and an inside surface of the brake shoe member, the first web structure extending from a first location at the inside surface towards the gap along a first radial axis that is parallel to the outer platform and the inside surface;

a first recessed region formed in a first portion of the first web structure near the first location, an inward radial extent of the first portion of the first web structure being reduced with respect to an inward radial extent of a second portion of the first web structure to create a first pivot point for the first friction lining mounting section, wherein the first recessed region acts as a hinge which facilitates pivoting movement of the first friction lining mounting section about the first recessed region during a braking operation; and a third web structure arranged substantially between the first web structure and a second web structure, wherein the brake shoe member, the first and the second friction mounting sections, and the first, the second and the third web structures are formed in a single piece construction.

* * * * *